H. C. BABCOCK.
Improvement in Preparing Manure for Transportation, Storage, or Market.
No. 130,616. Patented Aug. 20, 1872.
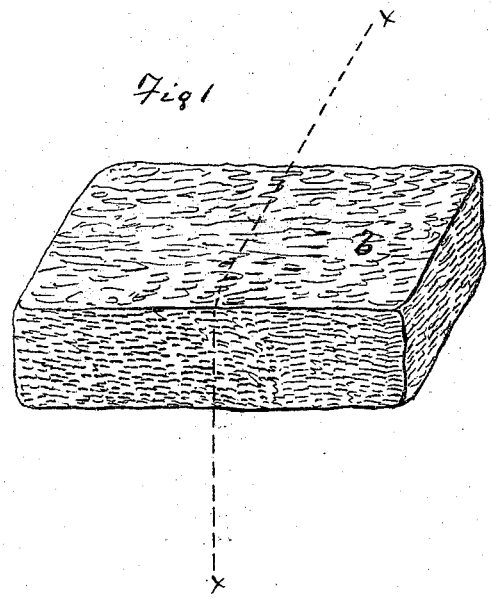
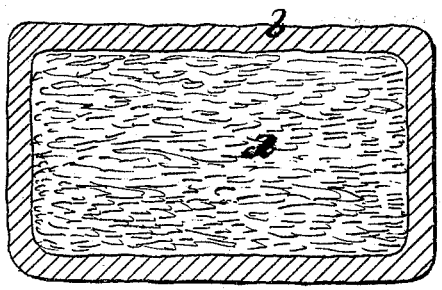

UNITED STATES PATENT OFFICE.

HOLLAND C. BABCOCK, OF HARTFORD, CONNECTICUT.

IMPROVEMENT IN PREPARING MANURE FOR TRANSPORTATION, STORAGE, OR MARKET.

Specification forming part of Letters Patent No. 130,616, dated August 20, 1872.

SPECIFICATION.

I, HOLLAND C. BABCOCK, of Hartford, in the county of Hartford and State of Connecticut, have invented certain new and useful Improvements in Preparing Stable-Manure for Storage, Transportation, or Market, of which the following is a specification, reference being had to the accompanying drawing, in which—

Figure 1 is a view of a bale of manure as produced by my process. Fig. 2 is a transverse section of the same through the plane indicated by the dotted line $x\ x$.

The object and purpose of this invention are the preparation and compression of stable-manure into a compact and portable bale or package, so that it can be readily stored or transported, and so that the air is, to a great extent, expressed from the manure, thus preventing the heating of the manure, first eliminating a larger part of the straw or other similar material which is used for bedding down the animals which produce the manure; and further, in covering the bale or package of manure with a coat of clay, peat, cement, plaster of Paris, or other similar matter adapted to the purpose, so as to disinfect the bale and confine the odors of the manure from escaping.

The great quantity of straw or bedding which is usually found in common stable-manure is of but little use for fertilizing purposes, and is an undesirable element in the compound, so that it is customary with farmers to let common manure lie till the straw it contains is thoroughly rotted before using it. To let manure lie thus long is, in large city stables, simply an impossibility on account of the great space required for such a purpose, and the offensive odors arising from such a vast mass in process of decomposition.

Again, the removal of the straw renders the manure more compressible and cohesive, so that it is desirable on all accounts to rid the manure of this almost useless element. While this straw is almost useless in fresh manure, it becomes of value when separated from the manure for further bedding purposes and for making straw paper of some grades.

I purpose to remove the straw from the manure by any machine or process adapted to the work, having at this time more especially in mind a machine with arms to beat and winnow out the straw while the solid manure falls to the floor ready for further manipulation.

It is, of course, not practicable to remove every small bit and grain of the straw, but it is meant that all the long straw and all except short pieces shall be beaten or winnowed out.

Having thus eliminated the straw or other bedding the residuum is then packed or pressed, in any apparatus adapted to the purpose, into any desired and suitable shape, preferably into a bale.

This compression of the manure almost wholly excludes atmospheric air from contact with the mass of the manure, and as it is this contact of air which mainly causes the manure to heat and steam, by this means I avoid and do away with the heating of the manure, which has heretofore made the transportation or storage of manure in an inclosed space, as the hold of a vessel or a box-car, troublesome and offensive. The heating of the manure also causes the manure to deteriorate in quality, for if the heating is allowed to go on, it will finally burn out all the valuable qualities of the manure.

When the manure is prepared as thus far described, it is rendered much more portable, valuable, and merchantable than it was before; but I have still another improvement, which is to coat the whole exterior of the bale with a covering of clay, peat, cement, plaster of Paris, or other material suitable and adapted to the purpose.

In the drawing, the letter $d$ indicates the bale of manure, and $b$ the coating. A bale of manure thus coated is rendered, to a great extent, non-odorous and innoxious; it is much less liable to heat, even if the straw be left in, than it is without such coating. The confining of the odors within the bale preserves the strength of the manure much better than if these odors are allowed to escape.

I claim as my invention—

1. The process of preparing manure for storage, transportation, or market by first eliminating the straw or bedding material, and then compressing the residuum into a bale, substantially as described and for the purpose set forth.

2. A bale of manure, covered with a coating substantially as described, for the purpose set forth.

Dated July 9, 1872.

HOLLAND C. BABCOCK.

Witnesses:
    Wm. E. Simonds,
    F. M. Daniels.